US010833915B2

(12) United States Patent
Zalpuri et al.

(10) Patent No.: US 10,833,915 B2
(45) Date of Patent: *Nov. 10, 2020

(54) APPLICATION PLUGIN FRAMEWORK FOR BIG-DATA CLUSTERS

(71) Applicant: EMC IP Holding Company LLC, Hopkinton, MA (US)

(72) Inventors: Naveen Zalpuri, Foster City, CA (US); Zehava Vardy, Sunnyvale, CA (US); Yunfeng Yang, Palo Alto, CA (US); Brady Chang, Austin, TX (US); Roderick Klinger, Hopkinton, MA (US); Kien Yih, Los Banos, CA (US); Bo Wu, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/804,466

(22) Filed: Feb. 28, 2020

(65) Prior Publication Data

US 2020/0204615 A1 Jun. 25, 2020

Related U.S. Application Data

(63) Continuation of application No. 15/860,276, filed on Jan. 2, 2018, now Pat. No. 10,623,475, which is a (Continued)

(51) Int. Cl.
*H04L 12/24* (2006.01)
*H04L 29/08* (2006.01)
(Continued)

(52) U.S. Cl.
CPC ............ *H04L 41/0226* (2013.01); *G06F 8/65* (2013.01); *G06F 9/4881* (2013.01); *H04L 43/50* (2013.01);
(Continued)

(58) Field of Classification Search
CPC ... H04L 41/0226; H04L 63/107; H04L 63/20; H04L 43/50; G06F 8/65; G06F 9/4881
See application file for complete search history.

(56) References Cited

U.S. PATENT DOCUMENTS 9,270,703 B1 * 2/2016 Clough ................... H04L 63/20
2006/0106931 A1 * 5/2006 Richoux ............... G06F 9/5027
709/226

(Continued)

*Primary Examiner* — Kyung H Shin
(74) *Attorney, Agent, or Firm* — Van Pelt, Yi & James LLP

(57) ABSTRACT

A system for a cluster application manager includes an input interface, a command determiner, and a node determiner. The input interface is for receiving a first management request for a management function for a first application of a set of different applications. The command determiner is for determining a first management base command for the first management request. A second management base command is the same as the first management base command for a second management request for the management function for a second application of the set of different applications that is different from the first application of the set of different applications. The command determiner is for determining a management command, wherein the management command is based at least in part on the first management base command and the first application. The node determiner is for determining a node of a cluster to send the management command.

22 Claims, 9 Drawing Sheets

Related U.S. Application Data continuation of application No. 14/581,678, filed on Dec. 23, 2014, now Pat. No. 9,894,147.

(51) Int. Cl.
  *H04L 29/06* (2006.01)
  *G06F 8/65* (2018.01)
  *G06F 9/48* (2006.01)
  *H04L 12/26* (2006.01)

(52) U.S. Cl.
  CPC ............ *H04L 63/10* (2013.01); *H04L 63/107* (2013.01); *H04L 67/10* (2013.01)

(56) References Cited

U.S. PATENT DOCUMENTS

| | | | |
|---|---|---|---|
| 2007/0067318 A1* | 3/2007 | Wolafka | H04L 41/0226 |
| 2010/0198955 A1* | 8/2010 | Maruyama | G06F 8/65 |
| | | | 709/223 |
| 2013/0080570 A1* | 3/2013 | Anderson, Jr. | H04L 43/50 |
| | | | 709/217 |

* cited by examiner

APPLICATION PLUGIN FRAMEWORK FOR BIG-DATA CLUSTERS

CROSS REFERENCE TO OTHER APPLICATIONS

This application is a continuation of co-pending U.S. patent application Ser. No. 15/860,276, entitled APPLICATION PLUGIN FRAMEWORK FOR BIG-DATA CLUSTERS filed Jan. 2, 2018, which is a continuation U.S. patent application Ser. No. 14/581,678, entitled APPLICATION PLUGIN FRAMEWORK FOR BIG-DATA CLUSTERS filed Dec. 23, 2014, now U.S. Pat. No. 9,894,147, which is incorporated herein by reference for all purposes.

BACKGROUND OF THE INVENTION

Big data clusters often comprise of hundreds to thousands of cluster machines running applications in concert. A cluster services provider supports the cluster machines, including setup, maintenance, software installation, etc. Installing software can require a cluster administrator to manually issue install commands on many cluster machines. However, manual issuing of commands is a complex, tedious, slow and error-prone process that is especially difficult because installation commands and procedures are not standardized between different pieces of software.

BRIEF DESCRIPTION OF THE DRAWINGS

Various embodiments of the invention are disclosed in the following detailed description and the accompanying drawings.

DETAILED DESCRIPTION

Figure 1:
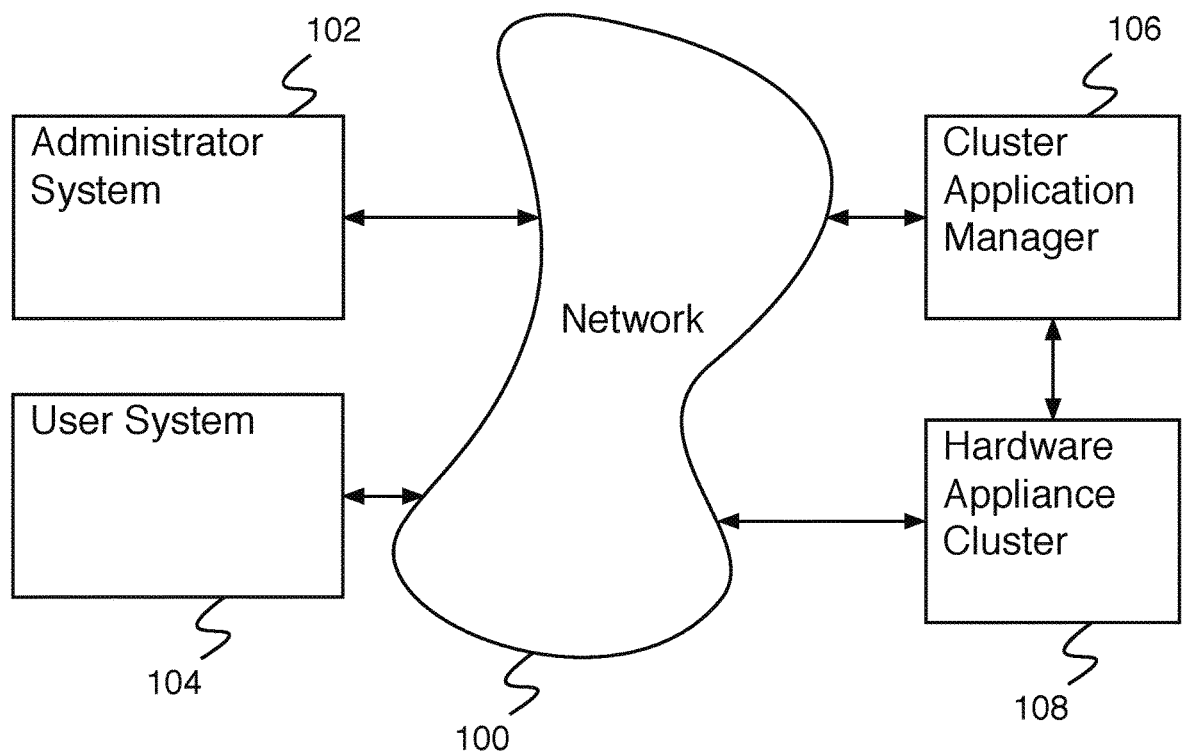
FIG. 1 is a block diagram illustrating an example embodiment of a network system.

The technology can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the technology is provided below along with accompanying figures that illustrate the technology. The technology is described in connection with such embodiments, but the technology is not limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of example and the technology may be practiced according to the claims without some or all of these specific details.

A system for a cluster application manager is disclosed. The system for a cluster application manager comprises an input interface for receiving a first management request for a management function for a first application of a set of different applications; a command determiner for determining a first management base command for the first management request; wherein a second management base command is identical to the first management base command for a second management request for the management function for a second application of the set of different applications that is different from the first application of the set of different applications; and determining a management command, wherein the management command is based at least in part on the first management base command and the first application; a node determiner for determining a node of a cluster to send the management command; and an output interface for providing the management command to the node of the cluster.

In some embodiments, a cluster application manages software applications on a set of nodes of a computing cluster. The cluster application manager comprises an interface for receiving commands via a network (e.g., from a system administrator) and providing management commands to a cluster. In some embodiments, the cluster application manger determines a management command to provide to the computing cluster based on a request for a management function. In various embodiments, the management function comprises installing software, uninstalling software, upgrading software, determining software status, or any other appropriate management function. Determining a management command comprises determining a base command (e.g., a generic command usable by the cluster application manager to execute the management function for any appropriate application—e.g., "install", "uninstall", "upgrade", etc.). The cluster application manager includes an application repository comprising a set of cluster ready applications. The cluster ready applications have been prepared (e.g., by adding a software wrapper—for example, an application programming interface (API)) to respond appropriately to the base commands. In some embodiments, a software wrapper for an application comprises a translator for receiving a base command, determining an application command corresponding to the base command, and providing the application command to the application. In some embodiments, a management command is determined from a base command and an application (e.g., the application to perform the base command on). The cluster application manager additionally determines a node of a cluster (e.g., a node of a cluster to provide the command to) considering hardware, operation, security, and/or other selection or sequencing issues. In some embodiments, a process for determining a node of a cluster is based at least in part on a heuristic (e.g., a security policy, a rack policy, a memory requirement, etc.). The cluster application manager provides the determined management command to the determined node (e.g., either as a single command or as a sequence of commands to a sequence of node or node groups).

In some embodiments, the cluster application manager comprises an efficient management tool to manage a large number of cluster nodes automatically that can have different interface requirements for a variety of applications which execute on the cluster nodes. The wrappers of each of the types of applications make the interface uniform for the cluster application manager so that the cluster application manager can efficiently manage the variety of applications.

In some embodiments, a cluster application manager tracks application software, including version of the application software, installed on nodes of a computing cluster. In the event that a request to install software is received, the cluster application manager determines which node or nodes of the cluster the application is to be installed on, and issues an install command. In the event that a request to uninstall software is received, the cluster application manager determines which node or nodes of the cluster the application is to be uninstalled from, and issues an uninstall command. The cluster application manager relies on the software wrapper to translate the base commands it issues to the application-specific commands required by the applications. In some embodiments, without the knowledge that the same command can be issued by the cluster application manager to perform the same management function for different pieces of software, the job of the cluster application manager is intractable.

In some embodiments, the cluster application manager tracks cluster configuration and application software installation variations. In the event that management commands are requested to be executed, the cluster application manager sequences or tailors providing commands to enable continuous operations (e.g., ability to service requests, functionality for tenanted clients, types of applications on specific hardware, etc.) to be available from the cluster despite the unavailability of the cluster nodes with applications that are being serviced.

In some embodiments, an application integration framework is used to provide a set of application programming interfaces (APIs) to enable a cluster application manager to talk to application plug-ins (e.g., a wrapped application and/or application installer). For example, the application integration framework responds to the following requesting calls:

aif_register (applicationName, applicationVersion, appPluginAbsolutePath, instanceName): This API loads the application plugin from the specified path into the application repository. After registering the application it can be deployed into the cluster eco-system; This API has inputs:

TABLE 1

| API Inputs | |
|---|---|
| Parameters | Description |
| applicationName | Name of the Application |
| applicationVersion | Version of the Application |

TABLE 1-continued

| API Inputs | |
|---|---|
| Parameters | Description |
| packageAbsolutePath | This gives the location where application plugin package is to be uploaded from |
| instanceName | The name that this instance would be associated with |

This API returns:

TABLE 2

| Return Values from API | |
|---|---|
| Parameter | Description |
| status | 0 for Success, non-zero for failure, −1 for Not Implemented |
| message | One line description of the message, for example, 'Success' or 'Failure' | aif_deploy (applicationName, applicationVersion, instanceName): This API deploys the Application instance on the cluster by invoking the corresponding plug-in API;

aif_uninstall (applicationName, applicationVersion, instanceName): This API uninstalls the Application instance on the cluster by invoking the corresponding plug-in API;

aif_verifyInstall (application, applicationVersion, instanceName): This API verifies the correctness of the Application deployment by invoking the corresponding plug-in API;

aif_healthcheck (applicationName, applicationVersion, instanceName): This API performs the health-check on the deployed Application by invoking the corresponding plug-in API;

aif_getStatus (applicationName, applicationVersion, instanceName): This API gets the status of the application by invoking the corresponding plug-in API. The status returned is whether application is running or stopped;

aif_startApp (applicationName, applicationVersion, instanceName): This API starts the Application by calling the corresponding plug-in API;

aif_stopApp(applicationName, applicationVersion, instanceName): This API stops the Application by calling the corresponding plug-in API;

The last seven APIs have inputs:

TABLE 3

| Inputs for APIs | |
|---|---|
| Parameters | Description |
| applicationName | Name of the Application |
| applicationVersion | Version of the Application |
| instanceName | The name that this instance would be associated with |

The last seven APIs return:

TABLE 4

Values Returned from API

| Parameter | Description |
|---|---|
| Status | 0 for Success, non-zero for failure, −1 for Not Implemented |
| Message | One line description of the message, for example, 'Success' or 'Failure' | aif_upgrade (applicationName, applicationVersion, instanceName, versionToUpgrade, packageToUpgradeAbosolutePath): This API upgrades an application instance to a different version; This API has inputs:

TABLE 5

Inputs for API

| Parameters | Description |
|---|---|
| applicationName | Name of the Application |
| applicationVersion | Version of the Application |
| instanceName | The name that this instance would be associated with |
| versionToUpgrade | The version of the Application to be upgraded to |
| packageToUpgradeAbosolutePath | If the aif_upgrade is called without having called aif_register, packageToUpgradeAbsolutePath is used for uploading and registering the application version into application repository before calling the corresponding plug-in API to perform upgrade to that version. |

This API returns:

TABLE 6

Values Returned by API

| Parameter | Description |
|---|---|
| Status | 0 for Success, non-zero for failure, −1 for Not Implemented |
| Message | One line description of the message, for example, 'Success' or 'Failure' | aif_reconfigure (applicationName, applicationVersion, instanceName): This API is called to reconfigure application instance; This API has inputs:

TABLE 7

API Inputs

| Parameters | Description |
|---|---|
| applicationName | Name of the Application |
| applicationVersion | Version of the Application |
| instanceName | The name that this instance would be associated with |
| configuration parameters | Future (the reconfigure will be handled by the plug-in without any input from upper layer |

This API returns:

TABLE 8

Values Returned by API

| Parameter | Description |
|---|---|
| status | 0 for Success, non-zero for failure, −1 for Not Implemented |
| message | One line description of the message, for example, 'Success' or 'Failure' | aif_expand (applicationName, applicationVersion, instanceName): This API is called to expand application instance to additional hosts; This API has inputs:

TABLE 9

API Inputs

| Parameters | Description |
|---|---|
| applicationName | Name of the Application |
| applicationVersion | Version of the Application |
| instanceName | The name that this instance would be associated with |
| listofnewhosts | Future (the expand will not take any user input and is probably going to be a no-op in Cypress release) |

This API returns:

TABLE 10

Values Returned by API

| Parameter | Description |
|---|---|
| status | 0 for Success, non-zero for failure, −1 for Not Implemented |
| message | One line description of the message, for example, 'Success' or 'Failure' | aif_listManagedApplications ( ): This API lists all the Applications that are deployed and managed by Application Integration framework; This API has no inputs; This API returns:

TABLE 11

| Values Returned by API |
|---|
| Description |
| Returns the list of Applications managed by cluster application manager |

For example, the application integration framework provides the following calls to each application:

plugin_aif_deploy (Logger L): return status, message: This API deploys the Application instance on the cluster;

plugin_aif_uninstall (Logger L): return status, message: This API uninstalls the previously installed Application instance on the cluster;

plugin_aif_verifyInstall (Logger L): return status, message: This API verifies whether an Application instance deployed on the cluster is installed correctly;

plugin_aif_healthcheck (Logger L): return status, message: This API runs the Application specific scripts to check if Application installed on the cluster is functional and ready for customers to use;

plugin_aif_getstatus (Logger L): return status, message: This API gets the runtime status of the Application whether it is up or down;

plugin_aif_getAppServicesStatus (Logger L): return status, message: This API returns the list of all process level services and their corresponding status for a given application;

plugin_aif_startApp (Logger L): return status, message: This API starts the Application;

plugin_aif_stopApp (Logger L): return status, message: This API stops the Application;

plugin_aif_upgrade (Logger L): return status, message: This API upgrades the Application to the version of the plugin;

plugin_aif_reconfigure (Logger L): return status, message: This API reconfigures the Application.

These APIs take instance of the logger class as input and return two statuses as shown in the following tables:
Input:

TABLE 12

| API Inputs | |
|---|---|
| Parameter | Description |
| Instance of Logger class | Use .logging function of Logger L to log to the logfile. |

Returns:

TABLE 12

| Return Values from API | |
|---|---|
| Parameter | Description |
| status | 0 for Success, non-zero for failure, −1 for Not Implemented |
| message | One line description of the message, for example, it is 'Success' or 'Failure,' or it includes a defined message for each error code |

FIG. 1 is a block diagram illustrating an example embodiment of a network system. In some embodiments, the network system of FIG. 1 comprises a system for installing and maintaining software (e.g., updating, configuring, removing, etc.) using cluster application manager 106. In the example shown, administrator system 102, user system 104, cluster application manager 106, and hardware appliance cluster 108 communicate with one another via network 100. In some embodiments, cluster application manager 106 has a direct communication link with hardware appliance cluster 108. In various embodiments, network 100 comprises one or more of the following: a local area network, a wide area network, a wired network, a wireless network, the Internet, an intranet, a storage area network, or any other appropriate communication network. In some embodiments, cluster application manager 106 is implemented on a computer that is one node or multiple nodes of hardware appliance cluster 108.

In various embodiments, administrator system 102, user system 104, cluster application manager 106, and hardware appliance cluster 108 and subsets thereof are in physical proximity to one another (e.g., in the same building, in the same room, etc.) or are physically remote from one another (e.g., in separate buildings of a campus, in separate locations of a business, at separate offices of a collaboration between organizations, in separate countries, etc.). In various embodiments, the processors comprising administrator system 102, user system 104, cluster application manager 106, and hardware appliance cluster 108 comprise any one of a variety of proprietary or commercially available single or multi-processor systems (e.g., an Intel-based processor) or other type of commercially available processor able to support communications in accordance with each particular embodiment and application. In various embodiments, hardware appliance cluster 108 comprises 4, 32, 193, 1024, 5000, M*2^N where M and N are integer nodes, or any other appropriate number of hardware appliances (e.g., computers). User system 104 comprises a system accessed by a user for using networked software (e.g., enterprise software, database software, engineering software, web interface, etc.). In some embodiments, user system 104 comprises a system that causes the execution of computing jobs on hardware appliance cluster 108. Administrator system 102 comprises a system accessed by an administrator for administrating the network system. For example, administrating the network system comprises configuring, installing, updating, maintaining, or removing application software, configuring, installing, updating, maintaining, or removing backup software, administering backup recovery operations, or any other appropriate administrator action. In some embodiments, administrator system 102 comprises a system for maintaining hardware appliance cluster 108. Cluster application manager 106 comprises a system for managing application software. In some embodiments, cluster application manager 106 comprises a system for managing application software on hardware appliance cluster 108. In some embodiments, cluster application manager 106 comprises a system for receiving a management request, determining a management command and one or more cluster nodes to receive the command, and providing the management command to the cluster node.

Figure 2:
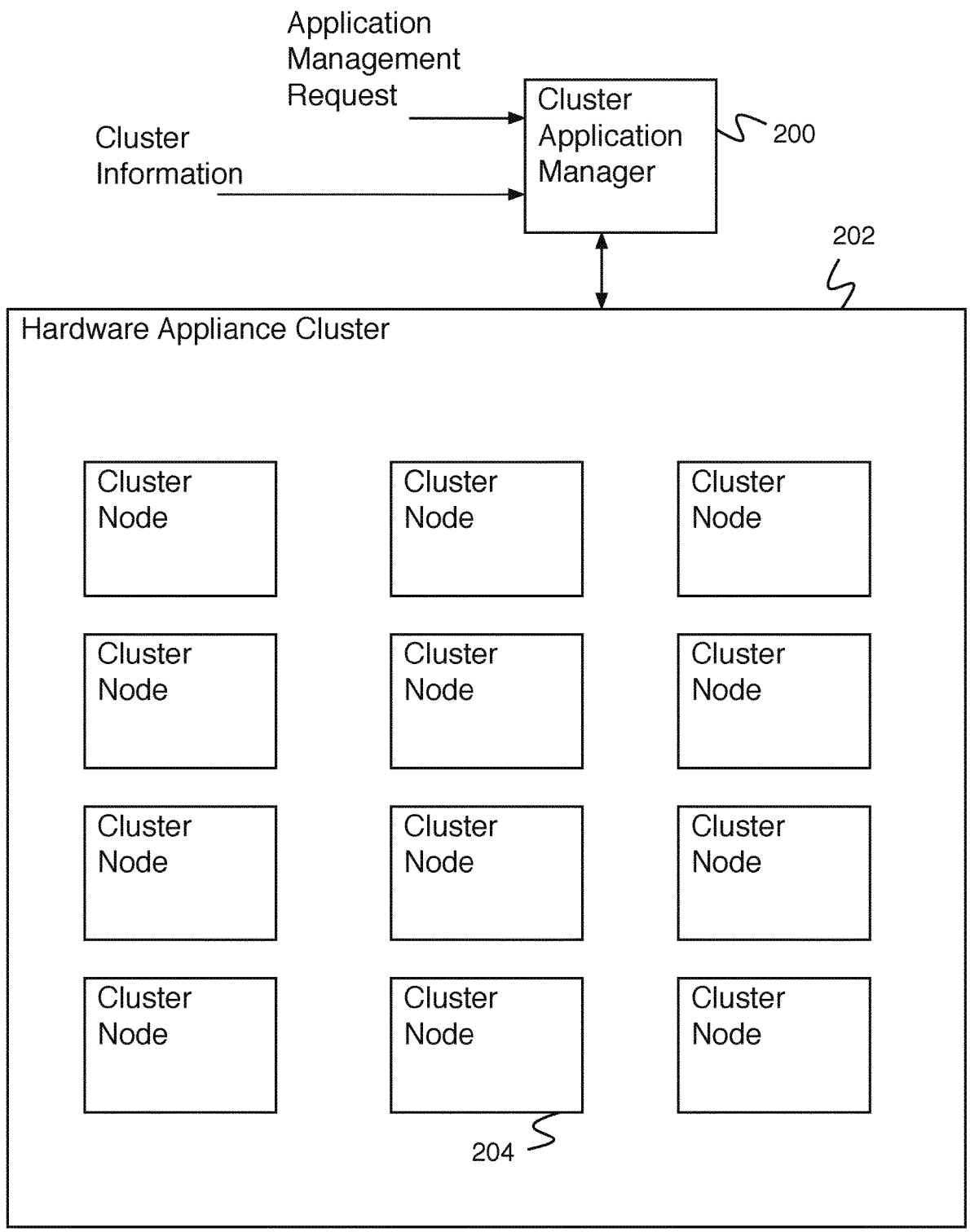
FIG. 2 is a block diagram illustrating an example embodiment of a cluster application manager and a hardware appliance cluster.

FIG. 2 is a block diagram illustrating an example embodiment of a cluster application manager and a hardware appliance cluster. In some embodiments, cluster application manager 200 comprises cluster application manager 106 of FIG. 1. In some embodiments, hardware appliance cluster 202 comprises hardware appliance cluster 108 of FIG. 1. In the example shown, cluster application manager 200 receives cluster information. For example, cluster application manager 200 receives cluster information from an administrator system via a network. In some embodiments, cluster application manager 200 receives cluster information directly from hardware appliance cluster 202. Cluster application manager 200 stores cluster information after receiving it (e.g., so the same information does not need to be sent multiple times). In various embodiments, cluster information comprises hardware appliance types, hardware appliance software versions, hardware appliance operating system versions, hardware appliance firmware versions, hardware appliance cluster organization information, hardware appliance cluster size information, or any other appropriate hardware appliance cluster information. Cluster application manager 200 additionally receives an application management request. In some embodiments, cluster application manager 200 receives an application management request from an administrator system via a network. In various embodiments, an application management request comprises a request to install an application, to uninstall an application, to upgrade an application, to check the status of an application, or to perform any other appropriate application management function. Hardware appliance cluster 202 comprises a set of cluster nodes (e.g., cluster node 204). In various embodiments, hardware appliance cluster 202 comprises 3, 12, 25, 512, 2000, M*2^N where M and N are integers, or any other appropriate number of cluster nodes. In some embodiments, cluster nodes are arranged into appliance racks (e.g., physical racks for storing cluster nodes, providing power to cluster nodes, providing communications to cluster nodes, etc.). In some embodiments, appliance racks are arranged into appliance groups (e.g., appliance groups based at least in part on location, function, etc.). In some embodiments, cluster application manager 200 determines a cluster node (e.g., of hardware appliance cluster 202) and a management command based on an application management request (e.g., a translation of the request enabling the wrapper of the application or the application itself to perform the request). For example, the management request is to enable the cluster to service a type of and a number of user requests; the cluster application manager 200 determines the application to install, its configuration, and the one or more nodes required to install the application, and the package (e.g., application installation and configuration information) and commands to transmit to the designated one or more nodes. In some embodiments, cluster application manager provides the management command to the cluster node or a group of cluster nodes.

In various embodiments, a management command and its command parameters to one or more selected cluster nodes comprises a command to transfer an application to a cluster node, to install an application on a cluster node, to uninstall an application from a cluster node, to start an application on a cluster node, to stop an application on a cluster node, to reconfigure an application on a cluster node, to upgrade an application on a cluster node, to downgrade an application on a cluster node, to expand an application to additional cluster nodes, to verify the correctness of an application on a cluster node, to perform a health check on an application on a cluster node, to list applications running on a cluster node, or to perform any other appropriate management function.

Figure 3:
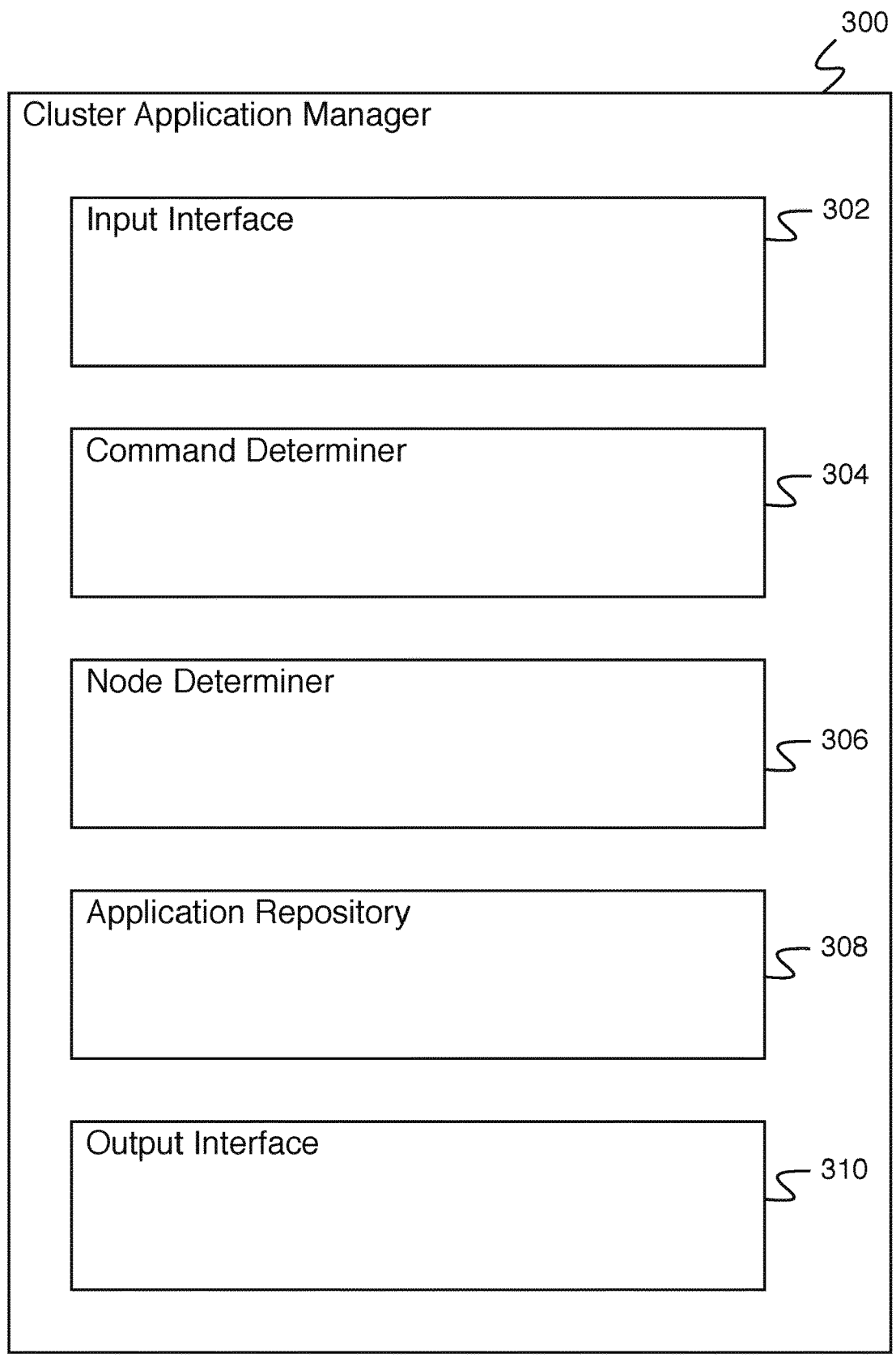
FIG. 3 is a block diagram illustrating an example embodiment of a cluster application manager.

FIG. 3 is a block diagram illustrating an example embodiment of a cluster application manager. In some embodiments, cluster application manager 300 comprises cluster application manager 200 of FIG. 2. In some embodiments, cluster application manager 300 is in communication with a hardware appliance cluster. In the example shown, cluster application manager 300 comprises input interface 302. In some embodiments, input interface 302 comprises an input interface for receiving cluster information and an application management request. In some embodiments, input interface 302 comprises an input interface for receiving information from a hardware appliance cluster. In some embodiments, an application management request comprises a request for a management function for an application. In some embodiments, input interface 302 receives status information (e.g., regarding the status of a request to perform an operation—for example, a success message, a failure message, an error message, etc.). In some embodiments, input interface 302 receives a log entry (e.g., a log entry describing the progress of a requested operation and its outcome). In some embodiments, input interface 302 is implemented using a processor. Command determiner 304 comprises a command determiner for determining an application management command. In some embodiments, command determiner determines a base command. In some embodiments, a base command comprises a generic application management command common between applications managed by the cluster application manager for performing an application function (e.g., a request to install an application, to uninstall an application, to upgrade an application, to check the status of an application, etc.). Command determiner 304 determines a management command based at least in part on the base command and on the application. In some embodiments, command determiner 304 determines a command to be provided to a node (e.g., of a hardware appliance cluster). In some embodiments, command determiner 304 is implemented using a processor. Node determiner 306 comprises a node determiner for determining a node. In some embodiments, determining a node comprises determining one or more nodes (e.g., one node or a plurality of nodes) on which to perform a management function. In some embodiments, node determiner 306 stores cluster information. In some embodiments, cluster information comprises received cluster information. In some embodiments, cluster information comprises application installation information (e.g., which applications have been installed on which cluster nodes). In some embodiments, node determiner 306 determines a node based at least in part on cluster information and an application management request. In some embodiments, node determiner 306 determines a node to receive a management command. In some embodiments, determining a node of a cluster is based at least in part on a heuristic. In various embodiments, determining a node of a cluster is based at least in part on a security policy (e.g., only a node associated with a tenant, a location, a set of different locations, etc.), a failsafe (e.g., a node on a set of different power supplies from other nodes with similar function, at a different location from other nodes with similar function), a tenancy policy (e.g., only on nodes associated with a specific tenant), a central processing unit (CPU) determination (e.g., only nodes with specific CPUs, only nodes with greater than x CPU parameter), an install limit (e.g., only limited to a certain number of nodes, only within a licensing bound, etc.), a rack policy (e.g., only a certain number of nodes per rack), a disk requirement (e.g., only with greater than a specific amount of disk space), a memory requirement (e.g., only with greater than a specific amount of memory), or any other appropriate heuristic or requirement. In some embodiments, node determiner 306 is implemented using a processor. Cluster application manager 300 additionally comprises application repository 308. In some embodiments, application repository 308 stores a set of applications. In some embodiments, the set of applications comprises a set of applications qualified for installation on the hardware appliance cluster. In some embodiments, the set of applications comprises a set of cluster ready applications. In some embodiments, a cluster ready application comprises an application including an application wrapper. In some embodiments, an application wrapper comprises an application wrapper for enabling an application to respond properly to a set of base commands (e.g., a translator between the commands that a cluster application manager provides and commands that an application/application installer accepts). In some embodiments, a management command for a node comprises a command instructing the node to download an application (e.g., transmission of the application and/or application installer from application repository 308 to the node and storage of the application and/or application installer on the node). In some embodiments, application repository 308 is implemented using a processor.

Output interface 310 comprises an output interface for communicating with a hardware appliance cluster. In some embodiments, output interface 310 comprises an output interface for communicating with a network. In some embodiments, output interface 310 provides a management command. In some embodiments, output interface 310 provides a cluster ready application. In some embodiments, output interface 310 is implemented using a processor. In various embodiments, modules of cluster application manager 300 are all implemented using a single hardware of computer processor, are each implemented on separate hardware or computer processors, are implemented combined onto multiple hardware or computer processors in any appropriate way, or are implemented in any other appropriate way.

Figure 4:
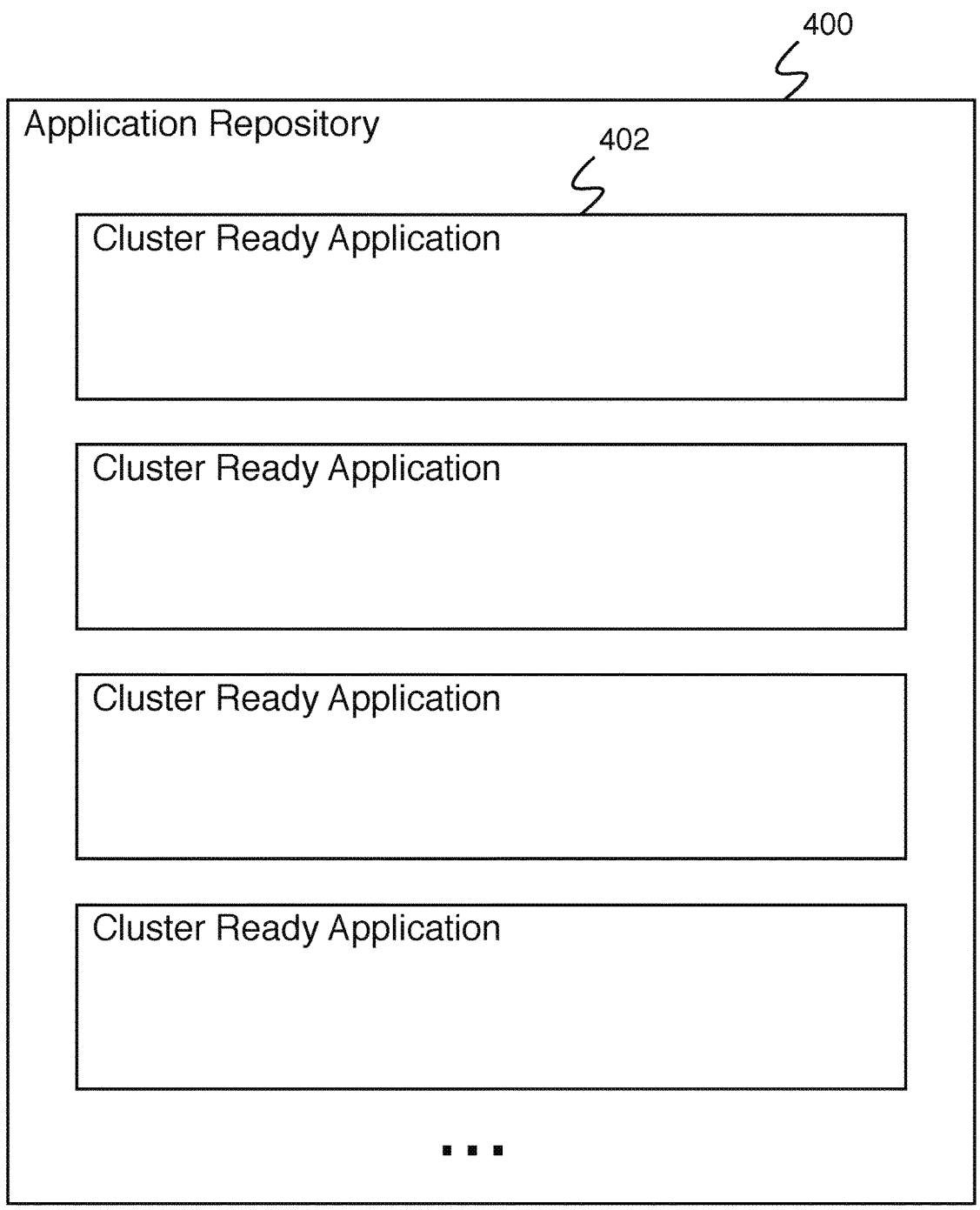
FIG. 4 is a block diagram illustrating an example embodiment of an application repository.

FIG. 4 is a block diagram illustrating an example embodiment of an application repository. In some embodiments, application repository 400 comprises application repository 308 of FIG. 3. In the example shown, application repository 400 comprises a set of cluster ready applications (e.g., cluster ready application 402). In various embodiments, the set of cluster ready applications comprises 1, 2, 5, 10, 17, or any other appropriate number of cluster ready applications. In some embodiments, cluster ready applications comprise versions of applications appropriate for running and installing an application on a node of a hardware appliance cluster. For example, an application repository stores a plurality of versions of a specific application. In some embodiments, cluster ready applications comprise applications and/or application installers configured to respond correctly to a set of base commands. In some embodiments, configuring an application and/or an application installer to respond correctly to a set of base commands comprises adding a wrapper to the application for translating base commands to application commands (e.g., the wrapper comprises a custom wrapper for the application to translate a set of generic base commands to a set of application specific application commands). In some embodiments, configuring an application to respond correctly to a set of base commands comprises interacting with an application developer to ensure that the application as initially developed responds correctly to the set of base commands.

Figure 5:
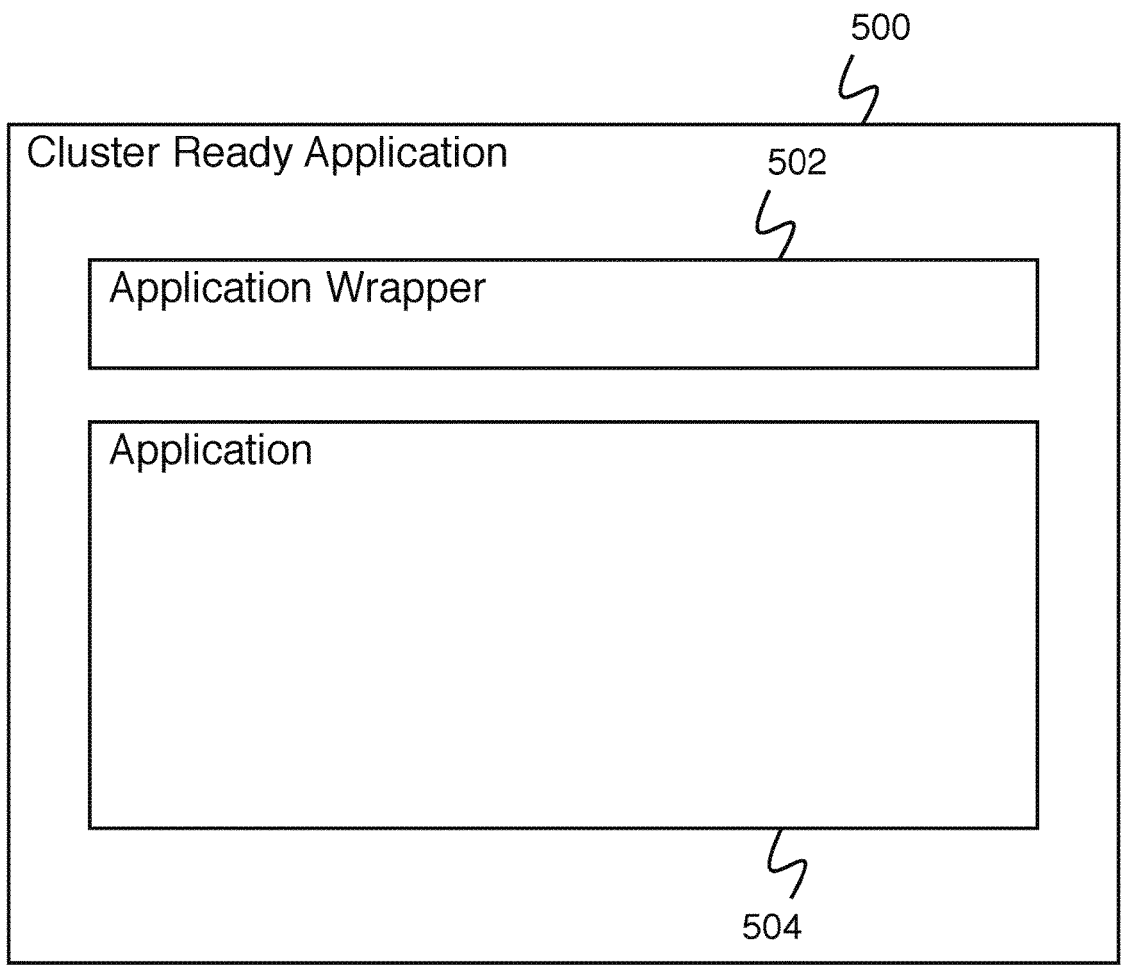
FIG. 5 is a block diagram illustrating an example embodiment of a cluster ready application.

FIG. 5 is a block diagram illustrating an example embodiment of a cluster ready application. In some embodiments, cluster ready application 500 comprises cluster ready application 402 of FIG. 4. In the example shown, cluster ready application 500 comprises application wrapper 502 and application 504. Application 504 comprises an application or an application installer appropriate for running on a hardware appliance cluster (e.g., a data processing application, a scientific computing application, a big data application, a database application, etc.). Application 504 includes an interface comprising a set of management commands (e.g., for installing or uninstalling the application, upgrading the application, managing the application, etc.). In some embodiments, the set of management commands comprise the same functionality as a set of base commands maintained by a command determiner for a cluster application manager. In some embodiments, the set of management commands differ in name and syntax from the set of base commands maintained by the command determiner for the cluster application manager. Application wrapper 502 comprises an application wrapper for translating a set of base commands (e.g., maintained by the command determiner for the cluster application manager) into a set of management commands (e.g., for application 504).

Figure 6:
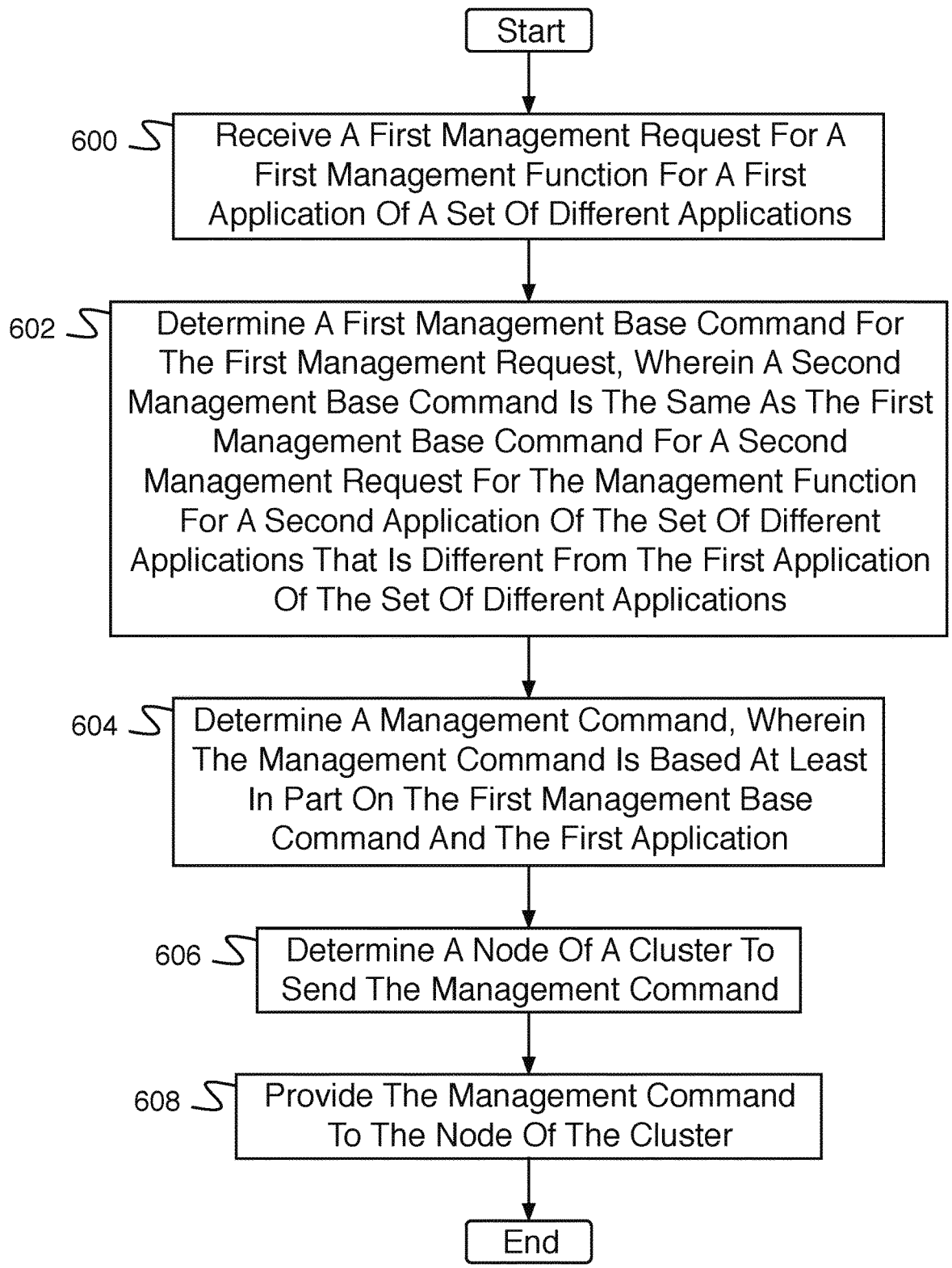
FIG. 6 is a flow diagram illustrating an example embodiment of a process for a cluster application manager.

FIG. 6 is a flow diagram illustrating an example embodiment of a process for a cluster application manager. In some embodiments, the process of FIG. 6 is executed by a cluster application manager (e.g., cluster application manager 300 of FIG. 3). In the example shown, in operation 600, a first management request for a first management function for a first application of a set of different applications is received. In operation 602, a first management base command for the first management request is determined, wherein a second management base command is the same as the first management base command for a second management request for the management function for a second application of the set of different applications that is different from the first application of the set of different applications. In operation 604, a management command is determined, wherein the management command is based at least in part on the first management base command and the first application. In some embodiments, one or more management commands are determined in order to achieve the request. In operation 606, a node of a cluster to send the management command is determined. In some embodiments, one or more nodes are determined to send the management command to. For example, a plurality of nodes is determined to be required to fulfill the request for the first management function and a plurality of nodes are determined to receive one or more management commands. In operation 608, the management command is provided to the node of the cluster. In some embodiments, one or more management commands are provided to the one or more determined nodes of the cluster to appropriately respond to the request.

Figure 7:
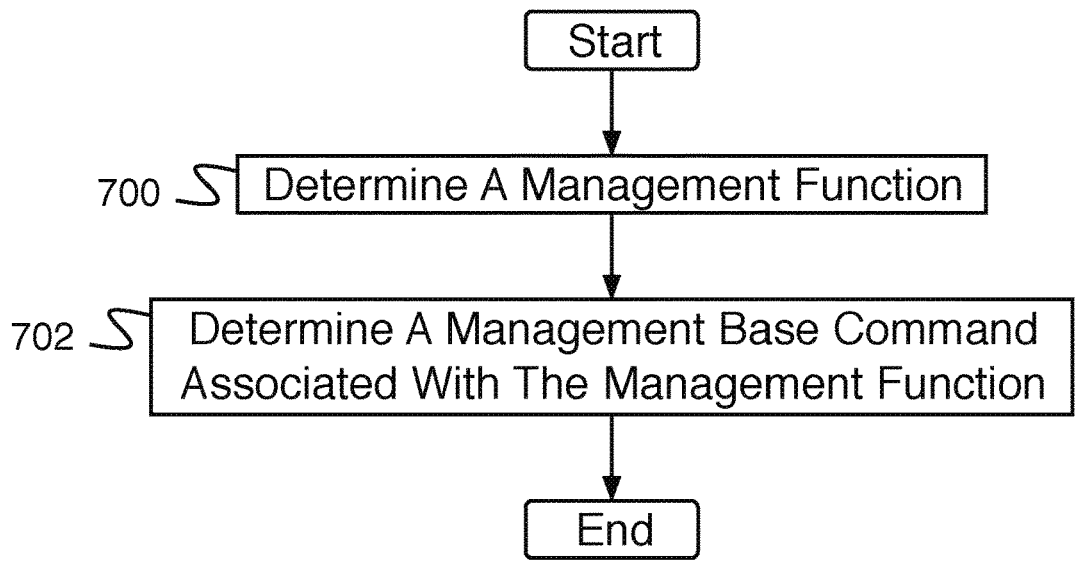
FIG. 7 is a flow diagram illustrating an example embodiment of a process for determining a management base command.

FIG. 7 is a flow diagram illustrating an example embodiment of a process for determining a management base command. In some embodiments, the process of FIG. 7 implements operation 602 of FIG. 6. In the example shown, in operation 700, a management function is determined. In some embodiments, a management function is determined from a management request. In operation 702, a management base command associated with the management function is determined. In some embodiments, the management base command is determined by looking up the management base command associated with the management function (e.g., in a management base command lookup table). In some embodiments, one management base command is associated with each management function (e.g., for all applications).

Figure 8:
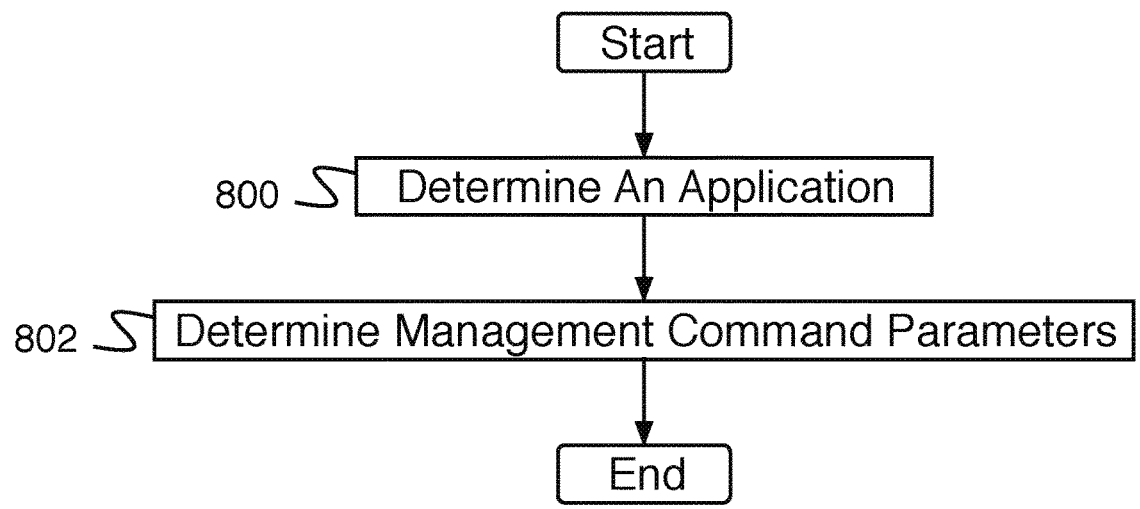
FIG. 8 is a flow diagram illustrating an example embodiment of a process for determining a management command.

FIG. 8 is a flow diagram illustrating an example embodiment of a process for determining a management command. In some embodiments, the process of FIG. 8 implements operation 604 of FIG. 6. In the example shown, in operation 800, an application is determined. In some embodiments, an application comprises an application for which a management request was received. In operation 802, management command parameters are determined. In various embodiments, management command parameters comprise application version, application location, instance name, or any other appropriate management command parameters. In various embodiments, management command parameters are determined from application settings, from cluster information, from a management request, from default management command parameters, or in any other appropriate way.

Figure 9:
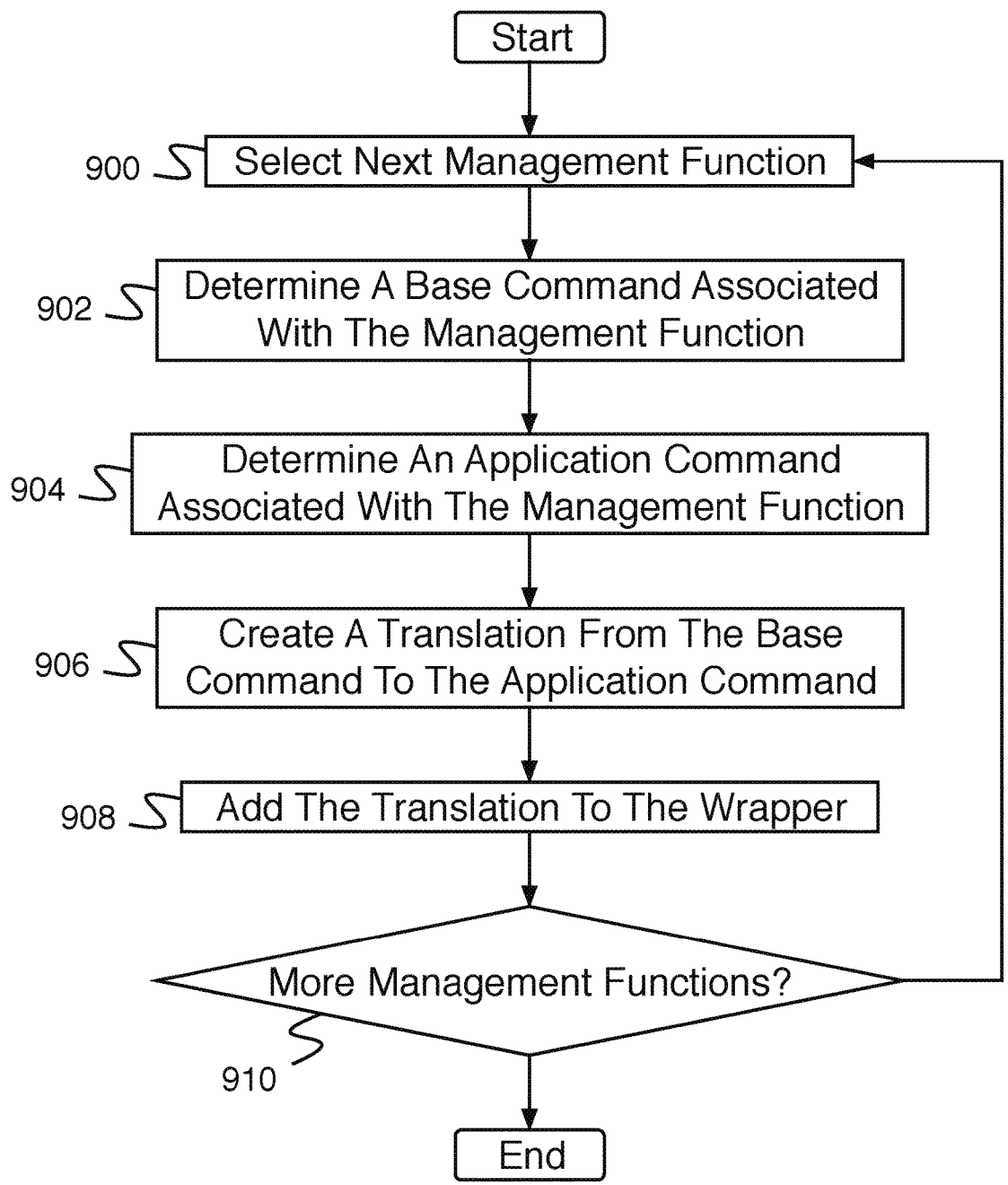
FIG. 9 is a flow diagram illustrating an example embodiment of a process for building an application wrapper for an application.

FIG. 9 is a flow diagram illustrating an example embodiment of a process for building an application wrapper for an application. In some embodiments, the process of FIG. 9 is used to build application wrapper 502 of FIG. 5. In the example shown, in operation 900, the next management function is selected. In some embodiments, the next management function comprises the first management function. In operation 902, a base command associated with the management function is determined (e.g., in a base command lookup table). In operation 904, an application command associated with the management function (e.g., an application command specific to the application to perform the management function) is determined (e.g., from an application programming interface, from application documentation, etc.). In operation 906, a translation from the base command to the application command is created. In some embodiments, creating a translation from the base command to the application command comprises creating a software translator that receives the base command and produces the application command. In various embodiments, a translation from the base command to the application command is created automatically (e.g., by a software translation creator), manually (e.g., by a human engineer), semi-automatically (e.g., by a human guiding a software translation creator), or in any other appropriate way. In operation 908, the translation is added to the wrapper. In decision operation 910, it is determined whether management functions. In the event it is determined that there are more management functions, control passes to operation 900. In the event it is determined that there are not more management functions, the process ends.

In some embodiments, a process for determining a node of a cluster is based at least in part on a heuristic. In various embodiments, a process for determining a node of a cluster is based at least in part on a security policy, a failsafe, a tenancy policy, a central processing unit (CPU) determination, an install limit, a rack policy, a disk requirement, a memory requirement, a storage-compute colocation, an isolation/protection domain, a quality of service/service level agreement, or any other appropriate heuristic.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
obtain a first management request for a management function for a first application of a set of different applications, wherein the management function corresponds to a common function across a plurality of the set of different applications;
determine a base command based at least in part on the first management request, wherein the base command is determined based at least in part on performing a lookup with respect to the management function and a mapping with management commands, the base command being a generic application management command common across a plurality of the set of different applications; and
communicate a command to a node of a cluster, wherein the command is based at least in part on the base command, and the base command is translated to a management command; and
one or more memories coupled to the one or more processors, configured to provide the one or more processors with instructions.

2. The system of claim 1, wherein a wrapper for an application running on the node of the cluster translates the base command to an application-specific command for the application.

3. The system of claim 1, wherein the base command is translated to an application specific command for at least one other application of the set of different applications, the at least one other application being different from the first application of the set of different applications.

4. The system of claim 1, wherein a cluster application manager determines a management command based at least in part on the base command and a particular application running on the node to which the management command is to be communicated, and the communication of the command to the node of the cluster comprises communicating the management command to the node of the cluster.

5. The system of claim 4, wherein the mapping with management commands corresponds to a mapping of management commands to management functions.

6. The system of claim 1, wherein the plurality of the set of different applications are respectively configured with a corresponding interface that translates the management command to an application specific command.

7. The system of claim 1, wherein the one or more processors are further configured to:
determine a node of a cluster to send the command, and the node of the cluster is determined based at least in part on the first management request.

8. The system of claim 1, wherein the first management request comprises one or more of the following: a request to install software, a request to uninstall software, a request to upgrade software, or a request to check a status of software.

9. The system of claim 1, wherein the one or more processors are further configured to receive a status.

10. The system of claim 9, wherein the status includes one or more of the following: a success message, a failure message, or an error message.

11. The system of claim 1, wherein the one or more processors are further configured to receive a log entry.

12. The system of claim 1, wherein the node of the cluster to which the command is to be communicated is determined is based at least in part on a heuristic.

13. The system of claim 12, wherein the heuristic is based on at least one of: a security policy, a failsafe, a tenancy policy, a central processing unit determination, an install limit, a rack policy, a disk requirement, or a memory requirement.

14. The system of claim 1, wherein the one or more processors are further configured to provide to the node of the cluster a cluster ready application.

15. The system of claim 14, wherein the cluster ready application is stored in an application repository.

16. The system of claim 15, wherein the application repository stores a plurality of versions of a specific application.

17. The system of claim 14, wherein the cluster ready application includes an application wrapper.

18. The system of claim 17, wherein the application wrapper includes an application programming interface to a cluster application manager.

19. The system of claim 1, wherein the first application comprises a wrapper that is configured to translate a set of a plurality of management commands received from a cluster application manager.

20. The system of claim 19, wherein the translator translates the set of the plurality of management commands to one or more commands in a format used by an application installer associated with the first application.

21. A method, comprising:
obtaining a first management request for a management function for a first application of a set of different applications, wherein the management function corresponds to a common function across a plurality of the set of different applications;
determining a base command based at least in part on the first management request, wherein the base command is determined based at least in part on performing a lookup with respect to the management function and a mapping with management commands, the base command being a generic application management command common across a plurality of the set of different applications; and providing a command to a node of a cluster, wherein the command is based at least in part on the base command, and the base command is translated to a management command.

22. A computer program product, the computer program product being embodied in a non-transitory computer readable storage medium and comprising computer instructions for:

obtaining a first management request for a management function for a first application of a set of different applications, wherein the management function corresponds to a common function across a plurality of the set of different applications;

determining a base command based at least in part on the first management request, wherein the base command is determined based at least in part on performing a lookup with respect to the management function and a mapping with management commands, the base command being a generic application management command common across a plurality of the set of different applications; and providing a command to a node of a cluster, wherein the command is based at least in part on the base command, and the base command is translated to a management command.

* * * * *